US012537119B2

(12) United States Patent
Suetsugu et al.

(10) Patent No.: US 12,537,119 B2
(45) Date of Patent: Jan. 27, 2026

(54) CHIP RESISTOR AND METHOD FOR PRODUCING SAME

(71) Applicant: Panasonic Intellectual Property Management Co., Ltd., Osaka (JP)

(72) Inventors: Daisuke Suetsugu, Osaka (JP); Norimichi Noguchi, Osaka (JP); Tatsuya Urakawa, Fukui (JP); Hiroki Oda, Fukui (JP); Daisuke Ueyama, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 389 days.

(21) Appl. No.: 18/247,704

(22) PCT Filed: Oct. 4, 2021

(86) PCT No.: PCT/JP2021/036549
§ 371 (c)(1),
(2) Date: Apr. 3, 2023

(87) PCT Pub. No.: WO2022/075238
PCT Pub. Date: Apr. 14, 2022

(65) Prior Publication Data

US 2023/0411051 A1 Dec. 21, 2023

(30) Foreign Application Priority Data

Oct. 6, 2020 (JP) ................................ 2020-169323

(51) Int. Cl.
*H01C 1/142* (2006.01)
*H01C 7/00* (2006.01)
(Continued)

(52) U.S. Cl.
CPC ............ *H01C 1/142* (2013.01); *H01C 7/006* (2013.01); *H01C 17/006* (2013.01); *H01C 17/12* (2013.01); *H01C 17/288* (2013.01)

(58) Field of Classification Search
CPC ...... H01C 1/142; H01C 7/006; H01C 17/006; H01C 17/12; H01C 17/288
See application file for complete search history.

(56) References Cited

U.S. PATENT DOCUMENTS 5,733,669 A * 3/1998 Veyhl .................... H01C 7/006 428/689
5,907,274 A * 5/1999 Kimura ............... H01C 17/281 338/308

(Continued)

FOREIGN PATENT DOCUMENTS

JP H05-347202 A 12/1993
JP H08-264304 A 10/1996

(Continued)

OTHER PUBLICATIONS

International Search Report dated Dec. 21, 2021 issued in International Patent Application No. PCT/JP2021/036549, with English translation.

*Primary Examiner* — Kyung S Lee
(74) *Attorney, Agent, or Firm* — Rimon P.C.

(57) ABSTRACT

A chip resistor includes an insulating substrate, a resistance element, and an electrode. The resistance element includes Cr, Si, and N and is disposed on the insulating substrate. The electrode includes at least one refractory metal and is disposed on the resistance element. An atomic ratio of Si to Cr in the resistance element is greater than or equal to ⅔ and less than or equal to 4 at least at a center of the resistance element in a thickness direction defined with respect to the resistance element. An atom percentage of N in the resistance element is lower than or equal to 50 atom % at least (Continued)

at the center of the resistance element in the thickness direction.

18 Claims, 7 Drawing Sheets

(51) Int. Cl.

| | |
|---|---|
| ***H01C 17/00*** | (2006.01) |
| ***H01C 17/12*** | (2006.01) |
| ***H01C 17/28*** | (2006.01) |

(56) References Cited

U.S. PATENT DOCUMENTS

| | | | | |
|---|---|---|---|---|
| 2019/0035520 | A1* | 1/2019 | Hiroshima ............. | H01C 1/032 |
| 2022/0030707 | A1* | 1/2022 | Noguchi .............. | H01C 17/006 |

FOREIGN PATENT DOCUMENTS

| | | | |
|---|---|---|---|
| JP | H10-144501 | A | 5/1998 |
| JP | 2001-322283 | A | 11/2001 |
| JP | 2001-332402 | A | 11/2001 |

* cited by examiner

CHIP RESISTOR AND METHOD FOR PRODUCING SAME

CROSS-REFERENCE OF RELATED APPLICATIONS

This application is the U.S. National Phase under 35 U.S.C. § 371 of International Patent Application No. PCT/JP2021/036549, filed on Oct. 4, 2021, which in turn claims the benefit of Japanese Patent Application No. 2020-169323, filed on Oct. 6, 2020, the entire disclosures of which Applications are incorporated by reference herein.

TECHNICAL FIELD

The present disclosure relates generally to chip resistors and methods for producing the chip resistors and specifically to a chip resistor applied to an electronic device and a method for producing the chip resistor.

BACKGROUND ART

Patent Literature 1 describes a thin film resistor (chip resistor) including a Si substrate (insulating substrate) and a resistance element as a thin film on the Si substrate. The resistance element includes, for example, Cr, Si, Al, and B.

In the thin film resistor described in Patent Literature 1, the resistance element has a specific resistance as high as 4000 μΩ·cm or higher, but a Temperature Coefficient of Resistance (TCR) is ±300 to 500 ppm/K or lower, that is, a low TCR cannot be obtained.

CITATION LIST

Patent Literature

Patent Literature 1: JP 2001-332402 A

SUMMARY OF INVENTION

It is an object of the present disclosure to provide a chip resistor configured to achieve both a high specific resistance and a low TCR and a method for producing the chip resistor.

A chip resistor according to an aspect of the present disclosure includes an insulating substrate, a resistance element, and an electrode. The resistance element includes Cr, Si, and N and is disposed on the insulating substrate. The electrode includes at least one refractory metal and is disposed on the resistance element. The refractory metal is a metal having a melting point of 800° C. or higher. An atomic ratio of Si to Cr in the resistance element is greater than or equal to ⅔ and less than or equal to 4 at least at a center of the resistance element in a thickness direction defined with respect to the resistance element. An atom percentage of N in the resistance element is lower than or equal to 50 atom % at least at the center of the resistance element in the thickness direction.

A chip resistor according to an aspect of the present disclosure includes an insulating substrate, a resistance element, and an electrode. The resistance element includes Cr, Si, N, and Al and is disposed on the insulating substrate. The electrode includes at least one refractory metal and is disposed on the resistance element. The refractory metal is a metal having a melting point of 800° C. or higher. An atomic ratio of Si to Cr in the resistance element is greater than or equal to ⅔ and less than or equal to 4 at least at a center of the resistance element in a thickness direction defined with respect to the resistance element. An atom percentage of N in the resistance element is lower than or equal to 50 atom % at least at the center of the resistance element in the thickness direction. An atom percentage of Al in the resistance element is lower than or equal to 30 atom % at least at the center of the resistance element in the thickness direction.

A production method according to an aspect of the present disclosure is a method for producing the chip resistor. The production method includes an electrode forming step and a patterning step. The electrode forming step includes forming the electrode on the resistance element by sputtering. The patterning step includes patterning the electrode on the resistance element by etching.

A production method according to an aspect of the present disclosure is a method for producing the chip resistor. The production method includes an electrode forming step. The electrode forming step includes forming the electrode on the resistance element by masked sputtering and patterning the electrode.

BRIEF DESCRIPTION OF DRAWINGS

FIG. 5 is a graph relating to the chip resistor and showing a relationship between an N ratio and a molar ratio in the resistance element, wherein FIG. 5 shows a ratio of a substance in an equilibrium state, and the ratio is obtained by a thermodynamic equilibrium calculation by FACTSAGE (Research Center of Computational Mechanics, Inc.);

DESCRIPTION OF EMBODIMENTS

Embodiment

A chip resistor 10 according to the present embodiment and a method for producing the chip resistor 10 will be described below with reference to FIGS. 1 to 7.

Note that the embodiment and variations described below are merely examples of the present disclosure, and the present disclosure is not limited to the embodiment and the variations described below. The present disclosure may be modified variously without departing from the scope of technical idea of the present disclosure, even if not including the embodiment and the variations below, according to design or the like.

Figures described in the following embodiment and the like are schematic views, and the ratio of sizes and the ratio of thicknesses of components do not necessarily reflect actual dimensional ratios.

(1) Overview of Chip Resistor

First of all, an overview of the chip resistor 10 according to the present embodiment will be described with reference to FIG. 1.

The chip resistor 10 according to the present embodiment is a chip resistor for a Surface Mount Technology (SMT) which uses, for example, a surface mounter (chip mounter) to mount the chip resistor onto a surface (mounting surface) of a printed circuit board. Moreover, the chip resistor 10 according to the present embodiment is, for example, a thin film chip resistor.

Figure 1:
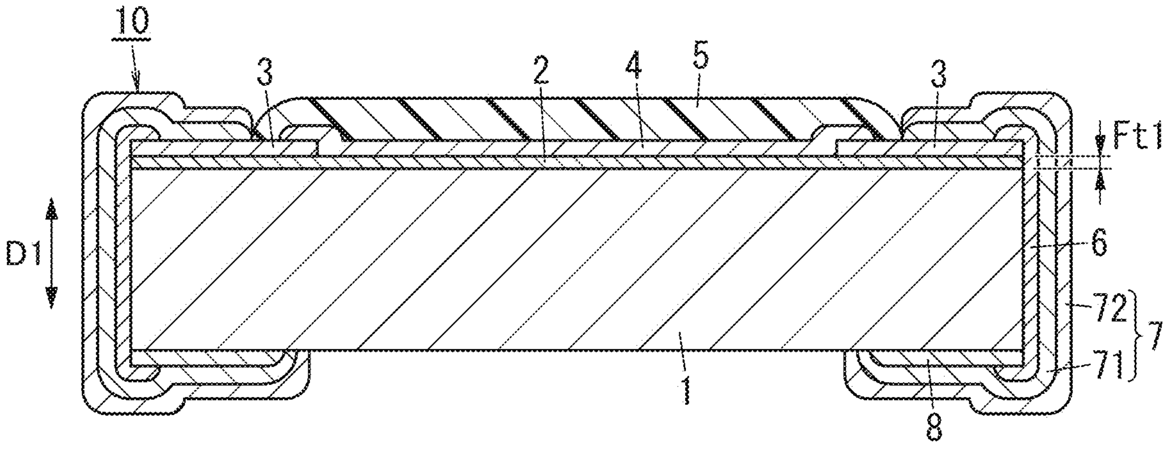
FIG. 1 is a sectional view of a chip resistor according to an embodiment.

The chip resistor 10 according to the present embodiment includes an insulating substrate 1, a resistance element 2, and an upper surface electrode (electrode) 3 as shown in FIG. 1. In the present embodiment, as an example, the resistance element 2 includes chrome (Cr), silicon (Si), and nitrogen (N). The resistance element 2 is disposed on the insulating substrate 1. The upper surface electrode 3 includes at least one refractory metal. As used in the present disclosure, the "refractory metal" means a metal having a melting point of 800° C. or higher. The upper surface electrode 3 is disposed on the resistance element 2. The atomic ratio of Si to Cr in the resistance element 2 is greater than or equal to ⅔ and less than or equal to 4 at least at the center of the resistance element 2 in a thickness direction D1 defined with respect to the resistance element 2. The atom percentage of N in the resistance element 2 is lower than or equal to 50 atom % at least at the center of the resistance element 2 in the thickness direction D1 as defined with respect to the resistance element 2.

In the chip resistor 10 according to the present embodiment, as described above, the atomic ratio of Si to Cr in the resistance element 2 is greater than or equal to ⅔ and less than or equal to 4 at least at the center of the resistance element 2 in the thickness direction D1 defined with respect to the resistance element 2. This enables the temperature coefficient of resistance (hereinafter also referred to as a "TCR") of the resistance element 2 to be reduced. Moreover, in the chip resistor 10 according to the present embodiment, as described above, the atom percentage of N in the resistance element 2 is lower than or equal to 50 atom % at least at the center of the resistance element 2 in the thickness direction D1 defined with respect to the resistance element 2. This enables the specific resistance of the resistance element 2 to be increased. That is, the chip resistor 10 according to the present embodiment enables both a high specific resistance and a low TCR to be achieved.

Moreover, in the chip resistor 10 according to the present embodiment, as described above, the upper surface electrode 3 includes at least one refractory metal. This enables heat treatment to be performed on the resistance element 2 on which the upper surface electrode 3 has been formed, and consequently, a surface oxynitride layer 9 is less likely to be formed at a contact portion where the resistance element 2 and the upper surface electrode 3 contact with each other, thereby also stabilizing an electrical connection between the resistance element 2 and the upper surface electrode 3.

(2) Configuration of Chip Resistor

Next, the configuration of the chip resistor 10 according to the present embodiment will be described with reference to FIG. 1.

The chip resistor 10 according to the present embodiment includes the insulating substrate 1, the resistance element 2, and a pair of upper surface electrodes (electrodes) 3 as shown in FIG. 1. The chip resistor 10 further includes a first protection film 4, a second protection film 5, a pair of end surface electrodes 6, a pair of plating layers 7, and a pair of back surface electrodes 8.

(2.1) Insulating Substrate

The insulating substrate 1 is, for example, an alumina substrate containing 96% to 99% alumina ($Al_2O_3$). The shape of the insulating substrate 1 in plan view (the shape viewed in the thickness direction defined with respect to the insulating substrate 1) is, for example, a rectangular shape.

(2.2) Resistance Element

The resistance element 2 is a thin film and is disposed on one surface (upper surface in FIG. 1) of the insulating substrate 1. The resistance element 2 includes an alloy including, for example, chrome (Cr), silicon (Si), and nitrogen (N). That is, the resistance element 2 includes Cr, Si, and N. The atomic ratio of Si to Cr in the resistance element 2 is greater than or equal to ⅔ and less than or equal to 4 at least at the center of the resistance element 2 in the thickness direction D1 defined with respect to the resistance element 2. In other words, the atomic ratio between Cr and Si in the resistance element 2 is greater than or equal to 3:2 and less than or equal to 1:4. Moreover, the atomic amount of N with respect to the atomic amount of metals included in the resistance element 2 is, for example, less than or equal to 50 atom %. In other words, the atom percentage of N in the resistance element 2 is lower than or equal to 50 atom % at least at the center of the resistance element 2 in the thickness direction D1 as defined with respect to the resistance element 2.

Moreover, in the present embodiment, the resistance element 2 further includes oxygen (O). The atom percentage of O in the resistance element 2 is lower than or equal to 10 atom % at least at the center of the resistance element 2 in the thickness direction D1 defined with respect to the resistance element 2. As used in the present disclosure, the "thickness direction D1" means a direction, along the thickness direction defined with respect to the insulating substrate 1, in the resistance element 2.

The resistance element 2 is formed in a substantially rectangular shape, for example, by forming a thin film conductor on almost the entire surface of the insulating substrate 1 by a thin film process such as sputtering and then removing an unnecessary portion of the thin film conductor by a photolithography process.

The atom composition ratio of the resistance element 2 is calculated from a spectrum ratio obtained for each of the elements, Cr, Si, N, and O with respect to an upper surface or a cross section of the resistance element 2, for example, by energy dispersive X-ray spectroscopy TEM-EDX or electron energy-loss spectroscopy TEM-EELS provided along with a transmission electron microscope TEM. Alternatively, the atom composition ratio of the resistance element 2 is calculated by correcting each atom composition ratio evaluated by X-ray photoelectron spectroscopy XPS on the basis of a correct coefficient of each element evaluated by Rutherford backscattering spectrometry RBS.

Figure 2:
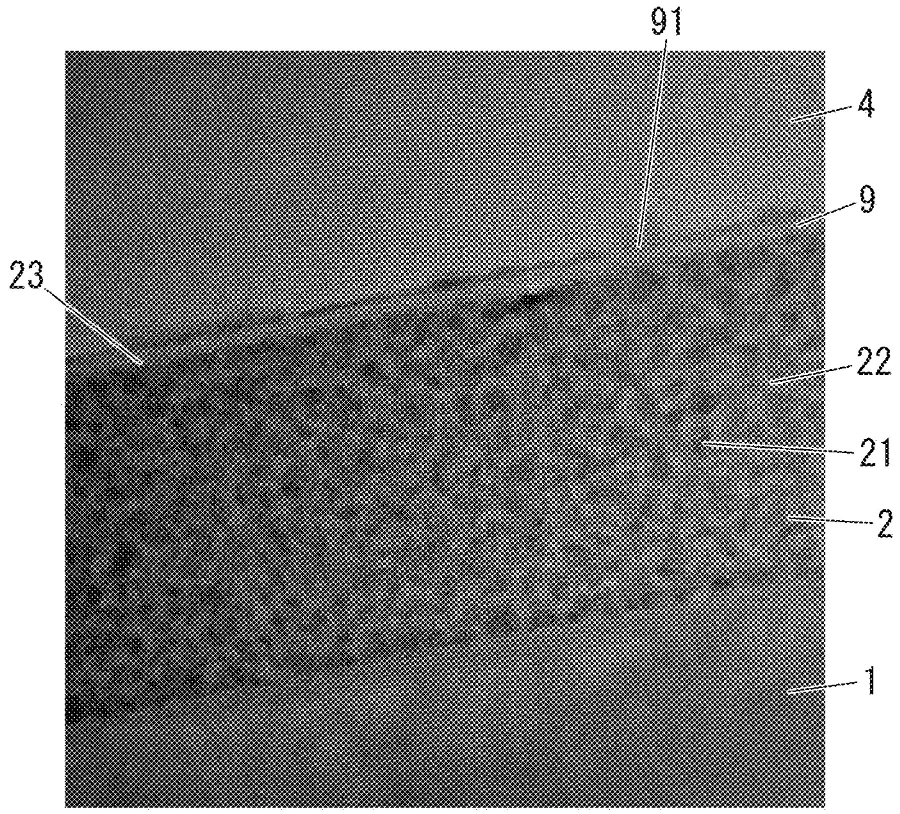
FIG. 2 is an image relating to the chip resistor and showing a crystal structure of a resistance element.

Incidentally, in the chip resistor 10 according to the present embodiment, the resistance element 2 includes a crystalline phase 21 and an amorphous phase 22 as shown in FIG. 2. The crystalline phase 21 includes, for example, $CrSi_2$ or $Cr_5Si_3$ and influences the TCR. The amorphous phase 22 includes, for example, $Si_3N_4$ or $SiO_2$ and influences on an improvement in the specific resistance. That is, the presence of those two phases enables both the improvement in the specific resistance and the low TCR to be achieved.

Moreover, the chip resistor 10 according to the present embodiment includes the surface oxynitride layer 9 formed between the resistance element 2 and the first protection film 4 in the thickness direction D1 defined with respect to the resistance element 2 as shown in FIG. 2. That is, the surface oxynitride layer 9 is disposed on a surface (upper surface in FIG. 2) 23 on an opposite side of the resistance element 2 from the insulating substrate 1. The surface oxynitride layer 9 is made of an oxynitride film including Si and at least one of Cr or Al. In the present embodiment, as an example, the surface oxynitride layer 9 is made of an oxynitride film including Cr and Si. More specifically, the surface oxynitride layer 9 includes Cr oxide and SiON. Note that the surface oxynitride layer 9 is formed by subjecting the resistance element 2 to heat treatment in a heat treatment step described later.

The surface oxynitride layer 9 has the advantage that an oxidation resistance is improved by a passive coating formed by the Cr oxide included in the surface oxynitride layer 9. The surface oxynitride layer 9 further has the advantage that the SiON included in the surface oxynitride layer 9 improves a gas barrier property. That is, the surface oxynitride layer 9 formed on the surface 23 of the resistance element 2 enables the environment resistance of the resistance element 2 to be improved.

Moreover, in the chip resistor 10 according to the present embodiment, the surface oxynitride layer 9 is disposed, not on the entirety of the surface 23 of the resistance element 2, but on a portion of the surface 23. More specifically, the surface oxynitride layer 9 is disposed on a portion which is part of the surface 23 of the resistance element 2, except for contact portions of the resistance element 2 to the pair of upper surface electrodes 3. In sum, the surface oxynitride layer 9 is disposed on a portion which is part of the surface 23 on an opposite side of the resistance element 2 from the insulating substrate 1, except for a portion where the pair of upper surface electrodes 3 are formed. As described above, no surface oxynitride layer 9 is disposed at the contact portions where the resistance element 2 is in contact with the pair of upper surface electrodes 3, and therefore, the electrical connection between the resistance element 2 and the pair of upper surface electrodes 3 can be stabilized.

(2.3) Upper Surface Electrode

Each of the pair of upper surface electrodes (electrodes) 3 includes at least one refractory metal. As described above, the refractory metal is a metal having a melting point of 800° C. or higher. The refractory metal is, for example, one of tungsten (W), rhenium (Re), osmium (Os), tantalum (Ta), molybdenum (Mo), iridium (Ir), ruthenium (Ru), boron (B), rhodium (Rh), vanadium (V), chrome (Cr), zirconium (Zr), platinum (Pt), titanium (Ti), palladium (Pd), iron (Fe), yttrium (Y), cobalt (Co), nickel (Ni), silicon (Si), gadolinium (Gd), beryllium (Be), manganese (Mn), copper (Cu), samarium (Sm), gold (Au), silver (Ag), germanium (Ge), and calcium (Ca). In the present embodiment, as an example, each of the pair of upper surface electrodes 3 includes tungsten (W) as the refractory metal. The pair of upper surface electrodes 3 cover portions of the upper surface (surface 23) of the resistance element 2 at both ends in the longitudinal direction (left/right direction in FIG. 1) of the resistance element 2. The pair of upper surface electrodes 3 are formed, for example, by forming a film of metal on the entirety of the upper surface of the resistance element 2 by sputtering and then removing the film at its center part by wet etching.

(2.4) First Protection Film

The first protection film (inorganic protection film) 4 is a film for protecting the resistance element 2. The first protection film 4 is made of, for example, alumina ($Al_2O_3$). The first protection film 4 is located on the upper surface of the resistance element 2. Moreover, the first protection film 4 covers portions of the pair of upper surface electrodes 3 at both ends in the longitudinal direction (left/right direction in FIG. 1) of the first protection film 4. That is, the first protection film 4 covers boundaries each located between the resistance element 2 and a corresponding one of the pair of upper surface electrodes 3 and covers at least the portions of the pair of upper surface electrodes 3 continuously from the resistance element 2 when viewed in the thickness direction D1 defined with respect to the resistance element 2 (the thickness direction defined with respect to the insulating substrate 1). The first protection film 4 is formed, for example, by forming a protection film on the entirety of the resistance element 2 and the pair of upper surface electrodes 3 by sputtering and then removing portions of the protection film at both the ends of the first protection film 4 by wet etching.

Thus, disposing the first protection film 4 enables corrosion of the resistance element 2 to be prevented. Note that the first protection film 4 may be a metal oxide other than the alumina or may be a metal nitride. Moreover, the first protection film 4 may be omitted.

(2.5) Second Protection Film

The second protection film (resin protection film) 5 is made of, for example, an epoxy resin. The second protection film 5 covers the entire surface of the first protection film 4 and portions of the pair of upper surface electrodes 3. That is, the second protection film 5 covers boundaries each located between the first protection film 4 and a corresponding one of the pair of upper surface electrodes 3 and covers at least the portions of the pair of upper surface electrodes 3 continuously from the first protection film 4 when viewed in the thickness direction D1 defined with respect to the resistance element 2 (the thickness direction defined with respect to the insulating substrate 1).

The second protection film 5 is formed, for example, by applying an epoxy resin by screen printing and then irradiating the epoxy resin with ultraviolet to cure the epoxy resin. Note that each of the pair of upper surface electrodes 3 include a portion located between a corresponding one of both the ends (portions covering the pair of upper surface electrodes 3) in the longitudinal direction (left/right direction in FIG. 1) of the first protection film 4 and one plating layer 7 of the plating layers 7 which faces the corresponding one of both the ends of the first protection film 4, and the portion is directly covered with the second protection film 5.

(2.6) End Surface Electrode

Each of the pair of end surface electrodes 6 is made of, for example, CuNi. The pair of end surface electrodes 6 are each located at a corresponding one of both ends in the longitudinal direction (left/right direction in FIG. 1) of the insulating substrate 1. The pair of end surface electrodes 6 are each formed at the corresponding one of both the ends in the longitudinal direction of the insulating substrate 1, for example, by sputtering. Each of the pair of end surface electrodes 6 is electrically connected to a corresponding upper surface electrode 3 of the pair of upper surface electrodes 3.

(2.7) Plating Layer

Each of the pair of plating layers 7 includes a Ni plating layer 71 and a Sn plating layer 72 as shown in FIG. 1. Each of the pair of plating layers 7 is electrically connected to a portion of a corresponding upper surface electrode 3 of the pair of upper surface electrodes 3 and is in contact with the second protection film 5. Moreover, each of the pair of plating layers 7 covers a corresponding end surface electrode 6 of the pair of end surface electrodes 6.

(2.8) Back Surface Electrode

Each of the pair of back surface electrodes 8 is made of, for example, an epoxy resin containing silver (Ag) as an electrically conductive substance. The pair of back surface electrodes 8 are each located at a corresponding one of both ends in the longitudinal direction (left/right direction in FIG. 1) of a back surface (lower surface in FIG. 1) of the insulating substrate 1. The pair of back surface electrodes 8 are formed, for example, by applying an epoxy resin at both the ends in the longitudinal direction of the back surface of the insulating substrate 1 by screen printing and then irradiating the epoxy resin with ultraviolet to cure the epoxy resin. The pair of back surface electrodes 8 correspond to the pair of upper surface electrodes 3 on a one-to-one basis. Note that the pair of back surface electrodes 8 may be omitted.

(3) Method for Producing Chip Resistor

Next, a method for producing the chip resistor 10 according to the present embodiment will be described.

A production method according to the present embodiment is the method for producing the chip resistor 10. The production method according to the present embodiment includes an electrode forming step of forming the upper surface electrodes 3 on the resistance element 2 and a patterning step (hereinafter also referred to as a "first patterning step") of patterning the upper surface electrodes 3. The production method according to the present embodiment further includes a resistance element forming step of forming the resistance element 2 on the insulating substrate 1 and a patterning step (hereinafter also referred to as a "second patterning step") of patterning the resistance element 2.

The resistance element forming step includes forming the resistance element 2 on the insulating substrate 1, for example, by reactive sputtering reacted with nitrogen or reactive sputtering reacted with nitrogen and oxygen. A sputtering target in the reactive sputtering includes, for example, Cr, Si, and O, and the atomic ratio between Cr and Si is 3:7, and the atom percentage of O is 20 atom %. That is, the sputtering target in the reactive sputtering incudes no more than 20 atom % oxygen (O).

The second patterning step includes patterning the resistance element 2 by etching the resistance element 2, for example, by photolithography. In the second patterning step, an etching solution including, for example, hydrofluoric acid is used.

The electrode forming step includes forming the upper surface electrodes 3 on the resistance element 2, for example, by sputtering. As described above, in the present embodiment, as an example, the upper surface electrodes 3 are assumed to include tungsten (W) as the refractory metal, and therefore, the sputtering target includes, for example, tungsten (W).

The first patterning step includes patterning the upper surface electrode 3, for example, by wet etching. In the first patterning step, an etching solution is used which includes, for example, hydrofluoric acid, sulfuric acid, nitric acid, or hydrochloric acid.

The production method according to the present embodiment further includes a heat treatment step. The heat treatment step is a step of performing heat treatment on the resistance element 2 on which the pattern of the upper surface electrodes 3 has been formed in the first patterning step. That is, in the present embodiment, the heat treatment step is performed after the first patterning step. In the heat treatment step, a heat treatment temperature is higher than or equal to 500° C. and lower than or equal to 800° C. In the present embodiment, for example, the heat treatment temperature is 520° C.±5° C. As used herein, the "heat treatment temperature" is a body (actual) temperature of the resistance element 2 in the present embodiment but may be an atmosphere temperature. Moreover, in the heat treatment step, the oxygen concentration is less than or equal to 1000 ppm.

Here, each of the pair of upper surface electrodes 3 is assumed to include no refractory metal. In this case, subjecting the resistance element 2 on which the pair of upper surface electrodes 3 have been formed to the heat treatment may result in melting of the pair of upper surface electrodes 3 depending on the heat treatment temperature. Therefore, in this case, the resistance element 2 is subjected to the heat treatment, and then, the pair of upper surface electrodes 3 are formed on the resistance element 2. However, in this case, the heat treatment performed on the resistance element 2 forms the surface oxynitride layer 9 on the surface of the resistance element 2, and therefore, the surface oxynitride layer 9 may impair the electrical connection between the resistance element 2 and the pair of upper surface electrodes 3.

In contrast, in the chip resistor 10 according to the present embodiment, as described above, each of the pair of upper surface electrodes 3 includes the refractory metal, and therefore, the resistance element 2 on which the pair of upper surface electrodes 3 have been formed can be subjected to the heat treatment. Thus, the surface oxynitride layer 9 is less likely to be formed at the contact portions where the resistance element 2 is in contact with the pair of upper surface electrodes 3, and therefore, the electrical connection between the resistance element 2 and the pair of upper surface electrodes 3 can be stabilized.

In the production method according to the present embodiment, as described above, the resistance element 2 is formed by reactive sputtering in the resistance element forming step, and therefore, the ratio of elements included in a target of the resistance element 2 is substantially the same as a target composition. Therefore, the chemical composition of the resistance element 2 can be controlled.

Moreover, in the production method according to the present embodiment, as described above, the heat treatment step is executed onto the resistance element 2 formed in the resistance element forming step. This enables the surface oxynitride layer 9 be formed on the surface 23 of the resistance element 2.

(4) Characteristics of Chip Resistor

Next, characteristics of the chip resistor 10 according to the present embodiment will be described with reference to FIGS. 3 to 7.

(4.1) Characteristic 1

Figure 3:
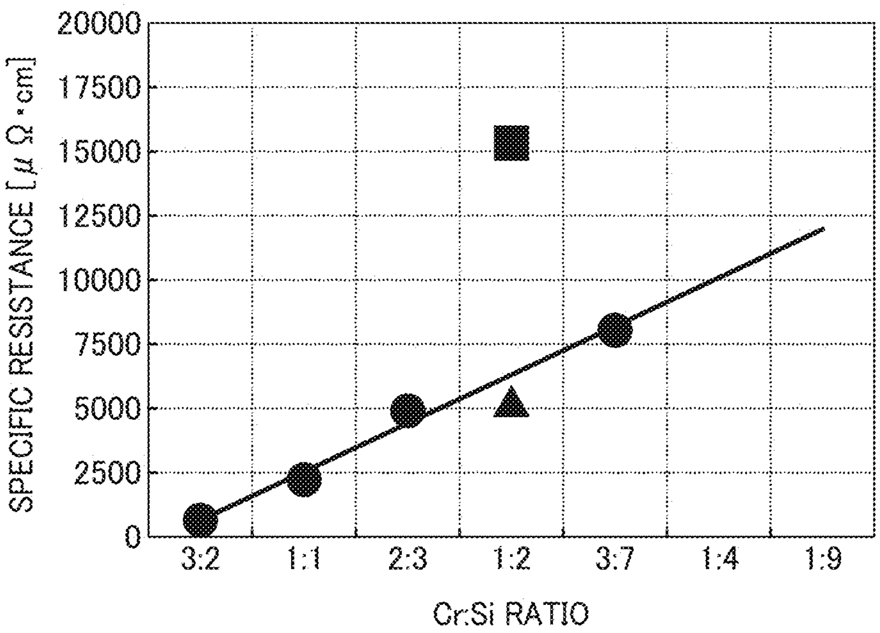
FIG. 3 is a graph relating to the chip resistor and showing a relationship between an atomic ratio and a specific resistance of Cr and Si.

First of all, Characteristic 1 of the chip resistor 10 according to the present embodiment will be described with reference to FIG. 3. In FIG. 3, the abscissa represents the atomic ratio between Cr and Si in the resistance element 2, and in FIG. 3, the ordinate represents the specific resistance of the resistance element 2. In the example shown in FIG. 3, the atom percentage of N in the resistance element 2 is 30 atom %.

In the chip resistor 10 according to the present embodiment, as described above, the resistance element 2 includes Cr, Si, N, and O but includes no Al (aluminum). In this case, as the atomic ratio between Cr and Si in the resistance element 2 changes from 3:2 to 1:4, the specific resistance of the resistance element 2 changes from about 500 μΩ·cm to about 10000 μΩ·cm (see black circles and the solid line in FIG. 3).

Here, the atomic ratio between Cr and Si in the resistance element 2 is assumed to be 1:2. In this case, the specific resistance of the resistance element 2 is about 6000 μΩ·cm in the case of the resistance element 2 including no Al. In contrast, the specific resistance of the resistance element 2 is about 15000 μΩ·cm in the case of the resistance element 2 including (added with) 21% Al (see the black square in FIG. 3). That is, the specific resistance of the resistance element 2 including 21% Al is about 2.5 times the specific resistance of the resistance element 2 including no Al. Thus, in the case of the atomic ratio between Cr and Si in the resistance element 2 being 1:4, the specific resistance of the resistance element 2 in the case of the resistance element 2 including 21% Al is about 25000 μΩ·cm. Therefore, in the chip resistor 10 according to the present embodiment, the specific resistance of the resistance element 2 is preferably greater than or equal to 500 μΩ·cm and less than or equal to 20000 μΩ·cm.

In the chip resistor 10 according to the present embodiment, changing the chemical composition of the resistance element 2 enables the specific resistance of the resistance element 2 to be adjusted.

(4.2) Characteristic 2

Figure 4:
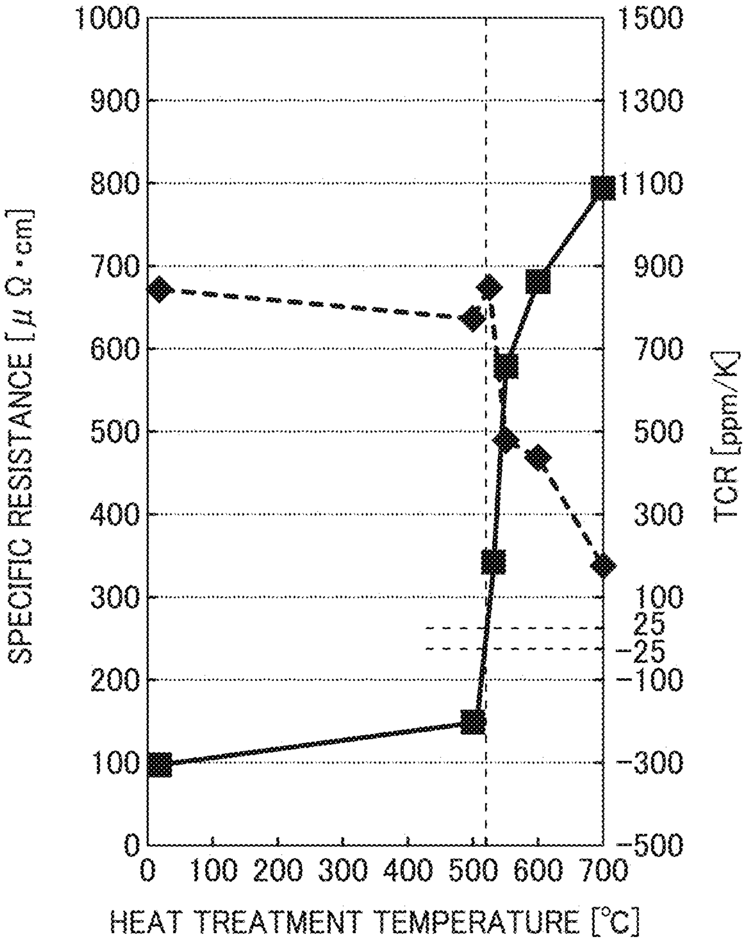
FIG. 4 is a graph relating to the chip resistor and showing a relationship among a heat treatment temperature, the specific resistance, and a TCR.

Next, Characteristic 2 of the chip resistor 10 according to the present embodiment will be described with reference to FIG. 4. In FIG. 4, the abscissa represents a heat treatment temperature in the heat treatment step. In FIG. 4, the ordinate on the left side represents the specific resistance of the resistance element 2, and in FIG. 4, the ordinate on the right side represents the TCR of the resistance element 2. In the example shown in FIG. 4, the atomic ratio between Cr and Si in the resistance element 2 is 3:2. In other words, the atomic ratio of Si to Cr in the resistance element 2 is ⅔. Moreover, in the example shown in FIG. 4, the atom percentage of N in the resistance element 2 is 12 atom %.

In the present embodiment, the heat treatment temperature in the heat treatment step is 520° C.±5° C. as described above. Thus, in the example shown in FIG. 4, the heat treatment temperature is set to 520° C.±5° C., and thereby, the TCR of the resistance element 2 can be higher than or equal to −25 ppm/K and lower than or equal to +25 ppm/K (see the solid line in FIG. 4). That is, in the chip resistor 10 according to the present embodiment, the temperature coefficient of resistance (TCR) of the resistance element 2 is higher than or equal to −25 ppm/° C. and lower than or equal to +25 ppm/° C.

In the chip resistor 10 according to the present embodiment, the TCR of the resistance element 2 can be higher than or equal to −25 ppm/° C. and lower than or equal to +25 ppm/° C., and therefore, both the high specific resistance and the low TCR can be achieved. Note that the broken line in FIG. 4 shows a change in the specific resistance of the resistance element 2 with respect to the heat treatment temperature.

(4.3) Characteristic 3

Figure 5:
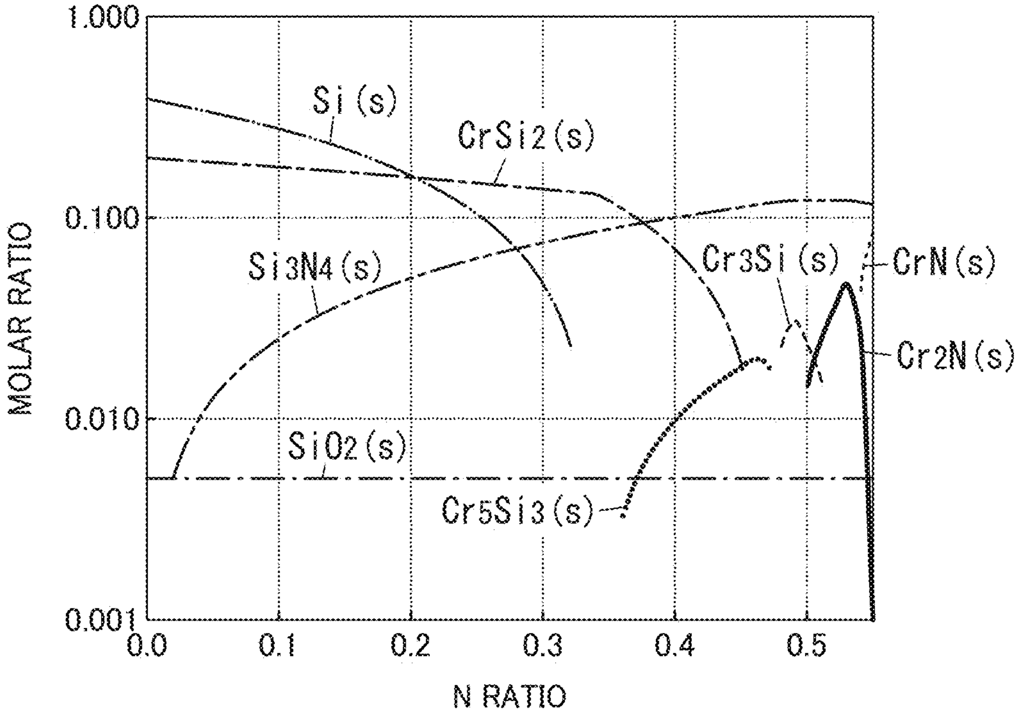

Next, Characteristic 3 of the chip resistor 10 according to the present embodiment will be described with reference to FIG. 5. In FIG. 5, the abscissa represents the atomic ratio of N (N ratio) in the resistance element 2, and in FIG. 5, the ordinate represents the molar ratio of each of crystals included in the resistance element 2. In the example shown in FIG. 5, the atomic ratio between Cr and Si in the resistance element 2 is 1:4. In other words, the atomic ratio of Si to Cr in the resistance element 2 is 4.

The example in FIG. 5 shows that the crystal of $Cr_2N$ having a different electrical characteristic increases from an N ratio of 50% as a boundary (see the solid line in FIG. 5). Thus, in the chip resistor 10 according to the present embodiment, the atom percentage of N (N ratio) in the resistance element 2 is preferably lower than or equal to 50 atom % at least at the center of the resistance element 2 in the thickness direction D1 defined with respect to the resistance element 2. This configuration enables the specific resistance of the resistance element 2 to be increased.

Incidentally, the atom percentage of N in the resistance element 2 is at least higher than or equal to 1 atom %. That is, the atom percentage of N in the resistance element 2 is at least higher than or equal to 1 atm % and at most lower than or equal to 50 atom % at least at the center of the resistance element 2 in the thickness direction D1 defined with respect to the resistance element 2.

(4.4) Characteristic 4

Figure 6:
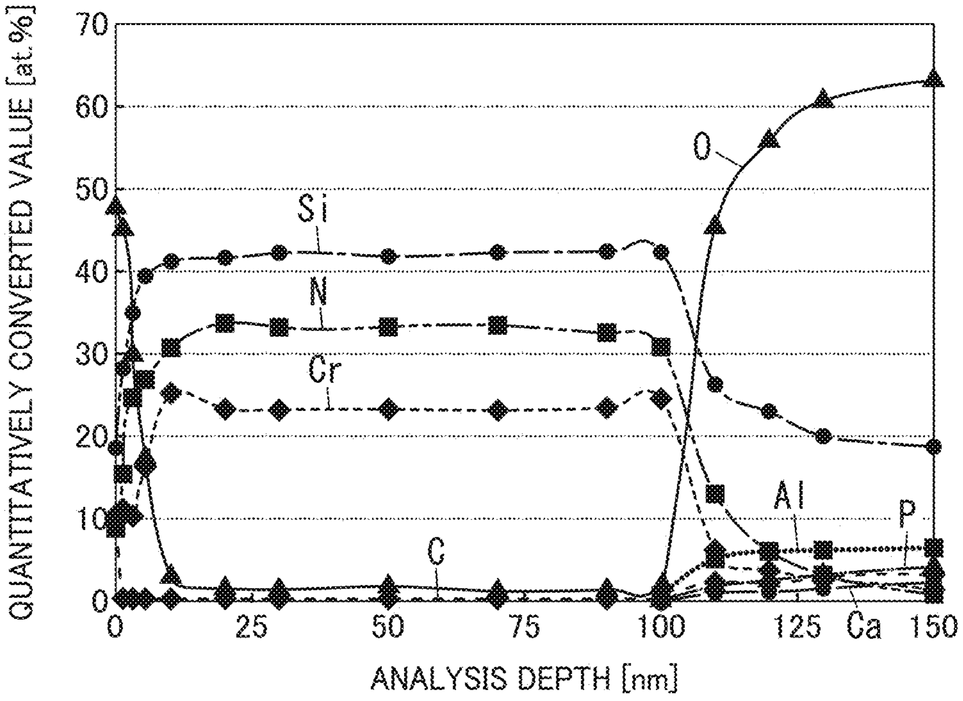
FIG. 6 is a graph relating to the chip resistor and showing a relationship between an analysis depth in the resistance element and a quantitatively converted value.

Next, Characteristic 4 of the chip resistor 10 according to the present embodiment will be described with reference to FIG. 6. FIG. 6 shows a result of elemental analysis of a film of the resistance element 2 formed on a glass substrate. In FIG. 6, the abscissa represents an analysis depth of the resistance element 2, and in FIG. 6, the ordinate represents a quantitatively converted value (atom percentage) of each element. FIG. 6 shows an example in which the atomic ratio between Cr and Si in the resistance element 2 is 1:2. In other words, the atomic ratio of Si to Cr in the resistance element 2 is 2. Moreover, in the example shown in FIG. 6, the atom percentage of N in the resistance element 2 is 30 atom %. Further, in the example shown in FIG. 6, the resistance element 2 has a thickness Ft1 of 100 nm.

In the chip resistor 10 according to the present embodiment, as described above, the resistance element 2 includes Cr, Si, N, and O. The thickness Ft1 of the resistance element 2 is 100 nm as described above. Thus, in this case, the center of the resistance element 2 in the thickness direction D1 defined with respect to the resistance element 2 is 50 nm. At a location where the analysis depth is 50 nm, the atom percentage (quantitatively converted value) of O in the resistance element 2 is about 2 atom % (see the solid line in FIG. 6). That is, in the chip resistor 10 according to the present embodiment, the atom percentage of O in the resistance element 2 is lower than or equal to 10 atom % at least at the center of the resistance element 2 in the thickness direction D1 defined with respect to the resistance element 2.

In the chip resistor 10 according to the present embodiment, the resistance element 2 includes oxygen (O), which enables the specific resistance of the resistance element 2 to be increased.

Here, the surface oxynitride layer 9 is disposed on the surface 23 of the resistance element 2 as described above, and the surface oxynitride layer 9 has a thickness of, for example, 10 nm. That is, in FIG. 6, a range in which the analysis depth is from 0 nm to 10 nm is the surface oxynitride layer 9. That is, the surface oxynitride layer 9 has a composition gradient from a surface 91 (see FIG. 2) of the surface oxynitride layer 9 into the surface oxynitride layer 9 in the thickness direction D1 defined with respect to the resistance element 2 as shown in FIG. 6. Thus, stress is relieved in the surface oxynitride layer 9, which provides the advantage that the surface oxynitride layer 9 is less likely to peel off from the resistance element 2.

Moreover, the atomic ratio of Si is greater than the sum of the atomic ratio of Cr and the atomic ratio of Al in the surface oxynitride layer 9, within the range of a depth of 10 nm from the surface 91 of the surface oxynitride layer 9 as shown in FIG. 6. This produces very stable passivity, thereby providing the advantages that the protective performance of the resistance element 2 is improved. Moreover, the atomic ratio of Cr to Si is higher at the surface (outermost surface) 91 of the surface oxynitride layer 9 than at the center of the resistance element 2 in the thickness direction D1 as shown in FIG. 6.

Incidentally, the atom percentage (quantitatively converted value) of O in the resistance element 2 is about 2 atom % in the example shown in FIG. 6, but the atom percentage of O is at most lower than or equal to 10 atom %. Moreover, the atom percentage of O in the resistance element 2 is at least higher than or equal to 0 atom %. That is, the atom percentage of O in the resistance element 2 is at least higher than or equal to 0 atom % and at most lower than or equal to atom %. The atom percentage of O in the resistance element 2 is more preferably higher than or equal to 0.1 atom % and lower than or equal to 10 atom %.

(4.5) Characteristic 5

Figure 7:
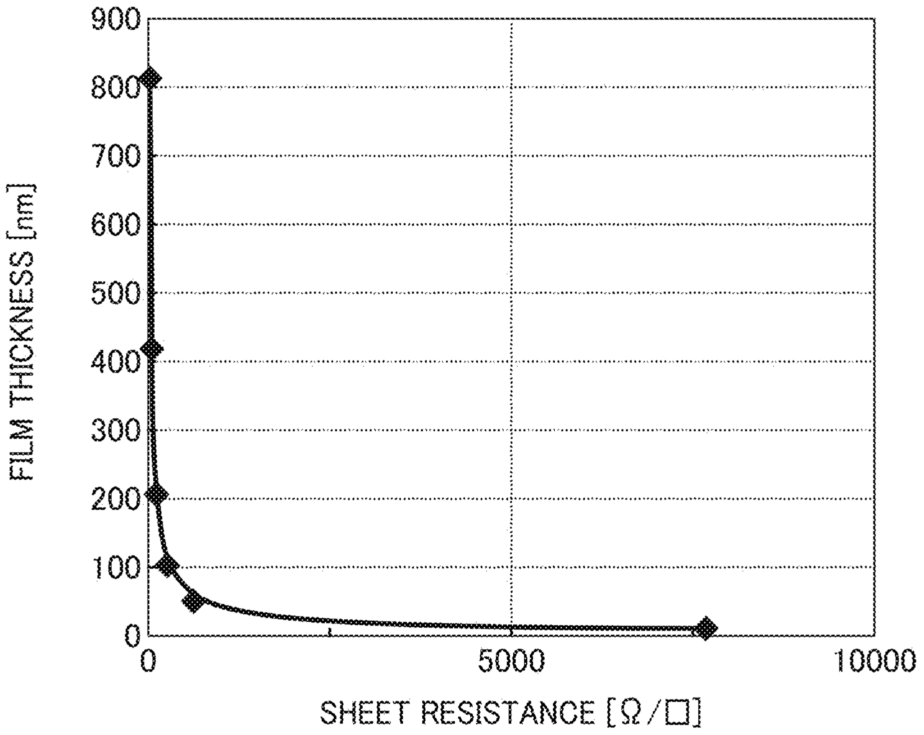
FIG. 7 is a graph relating to the chip resistor and showing a relationship between a thickness of the resistance element and a sheet resistance.

Next, Characteristic 5 of the chip resistor 10 according to the present embodiment will be described with reference to FIG. 7. In FIG. 7, the abscissa represents the sheet resistance of the resistance element 2, and in FIG. 7, the ordinate represents the thickness Ft1 (see FIG. 1) of the resistance element 2. In the example shown in FIG. 7, the atomic ratio between Cr and Si in the resistance element 2 is 1:2. In other words, the atomic ratio of Si to Cr in the resistance element 2 is 2. Moreover, in the example shown in FIG. 7, the atom percentage of N in the resistance element 2 is 30 atom %.

In the example shown in FIG. 7, the sheet resistance of the resistance element 2 is about 10Ω/□ when the thickness Ft1 of the resistance element 2 is about 800 nm, and is about 7500Ω/□ when the thickness Ft1 of the resistance element 2 is about 5 nm (see the solid line in FIG. 7). In the chip resistor 10 according to the present embodiment, adjusting the thickness Ft1 of the resistance element 2 enables the sheet resistance of the resistance element 2 to be adjusted. As described above, in the chip resistor 10 according to the present embodiment, the thickness Ft1 of the resistance element 2 is preferably greater than or equal to 5 nm and less than or equal to 1000 nm.

(5) Effects

The chip resistor 10 according to the present embodiment includes the insulating substrate 1, the resistance element 2, and the upper surface electrodes (electrodes) 3 as described above. The resistance element 2 includes Cr, Si, and N and is disposed on the insulating substrate 1. The upper surface electrodes 3 include at least one refractory metal and are disposed on the resistance element 2. The refractory metal is a metal having a melting point of 800° C. or higher. The atomic ratio of Si to Cr in the resistance element 2 is greater than or equal to ⅔ and less than or equal to 4 at least at the center of the resistance element 2 in a thickness direction D1 defined with respect to the resistance element 2. The atom percentage of N in the resistance element 2 is lower than or equal to 50 atom % at least at the center of the resistance element 2 in the thickness direction D1.

In the chip resistor 10 according to the present embodiment, as described above, the atomic ratio of Si to Cr in the resistance element 2 is greater than or equal to ⅔ and less than or equal to 4 at least at the center of the resistance element 2 in the thickness direction D1 defined with respect to the resistance element 2. This enables the TCR of the resistance element 2 to be reduced. Moreover, in the chip resistor 10 according to the present embodiment, as described above, the atom percentage of N in the resistance element 2 is lower than or equal to 50 atom % at least at the center of the resistance element 2 in the thickness direction D1 defined with respect to the resistance element 2. This enables the specific resistance of the resistance element 2 to be increased. That is, the chip resistor 10 according to the present embodiment enables both a high specific resistance and a low TCR to be achieved.

Moreover, in the chip resistor 10 according to the present embodiment, the upper surface electrodes 3 disposed on the resistance element 2 include the refractory metal as described above. Therefore, the resistance element 2 on which the upper surface electrodes 3 have been formed can be subjected to the heat treatment, and consequently, a surface oxynitride layer 9 is less likely to be formed at a contact portion where the resistance element 2 and the upper surface electrode 3 contact with each other, thereby also stabilizing an electrical connection between the resistance element 2 and the upper surface electrode 3.

(6) Variations

The embodiment described above is a mere example of various embodiments of the present disclosure. Various modifications may be made to the embodiment described above depending on design or the like as long as the object of the present disclosure is achieved. Variations of the embodiment described above will be described below. The variations described below are accordingly applicable in combination.

(6.1) First Variation

In the embodiment described above, the resistance element 2 includes Cr, Si, N, and O, but the resistance element 2 may include aluminum (Al) in addition to Cr, Si, N, and O. In other words, in a chip resistor 10 according to a first variation, a resistance element 2 includes Cr, Si, N, and Al. The atom percentage of Al in the resistance element 2 is preferably lower than or equal to 30 atom % at least at the center of the resistance element 2 in the thickness direction D1 defined with respect to the resistance element 2 as described above.

Moreover, in the chip resistor 10 according to the first variation, the atomic ratio of Si to Cr in the resistance element 2 is preferably greater than or equal to ⅔ and less than or equal to 4 at least at the center of the resistance element 2 in a thickness direction D1 defined with respect to the resistance element 2. Further, in the chip resistor 10 according to the first variation, the atom percentage of N in the resistance element 2 is preferably lower than or equal to 50 atom % at least at the center of the resistance element 2 in the thickness direction D1 as defined with respect to the resistance element 2.

Furthermore, in the chip resistor 10 according to the first variation, each of pair of upper surface electrodes (electrodes) 3 includes at least one refractory metal and is disposed on the resistance element 2. The refractory metal is a metal having a melting point of 800° C. or higher as described above.

In the chip resistor 10 according to the first variation, the resistance element 2 includes Al in addition to Cr, Si, N, and O. This enables the specific resistance of the resistance element 2 to be increased compared with the case where the resistance element 2 includes no Al.

Moreover, in the chip resistor 10 according to the first variation, each of the pair of upper surface electrodes 3 includes the refractory metal as described above. This enables heat treatment to be performed on the resistance element 2 on which the upper surface electrode 3 has been formed, and consequently, a surface oxynitride layer 9 is less likely to be formed at a contact portion where the resistance element 2 and the upper surface electrode 3 contact with each other, thereby stabilizing an electrical connection between the resistance element 2 and the upper surface electrode 3.

(6.2) Other Variations

In the embodiment described above, each of the pair of upper surface electrodes 3 includes tungsten (W) as the refractory metal, but this should not be construed as limiting the disclosure. Each of the pair of upper surface electrodes 3 may include, for example, one of the metals, other than W, mentioned above as examples of the refractory metal. Moreover, each of the pair of upper surface electrodes 3 may include two or more refractory metals. In this case, each of the pair of upper surface electrodes 3 may have a single layer structure of an alloy made of the two or more refractory metals or may have a layered structure formed by stacking the two or more refractory metals on each other.

In the embodiment described above, the upper surface electrodes 3 are patterned by wet etching in the first patterning step, but the upper surface electrode 3 may be patterned, for example, by dry etching.

In the embodiment described above, the upper surface electrodes 3 are formed on the resistance element 2 by sputtering, and then, the upper surface electrodes 3 are patterned by wet etching, but this should not be construed as limiting the disclosure. For example, the upper surface electrodes 3 may be formed by masked sputtering and the upper surface electrodes 3 may be patterned. That is, the method for producing the chip resistor 10 may include an electrode forming step of forming the upper surface electrodes 3 on the resistance element 2 by masked sputtering and patterning the upper surface electrode 3. Specifically, the surface 23 of the resistance element 2 is masked except for a portion of the surface 23 where the pattern of the upper surface electrodes 3 is to be formed. Then, the surface 23 of the resistance element 2 is subjected to sputtering, thereby forming the pattern of the upper surface electrodes 3 on the surface 23 of the resistance element 2. This enables the upper surface electrodes 3 including at least one refractory metal to be formed on the resistance element 2. This enables heat treatment to be performed on the resistance element 2 on which the upper surface electrode 3 has been formed, and consequently, a surface oxynitride layer 9 is less likely to be formed between the resistance element 2 and the upper surface electrode 3, thereby stabilizing an electrical connection between the resistance element 2 and the upper surface electrode 3.

(Aspects)

The embodiment, the variations described above, and the like disclose the following aspects.

A chip resistor (10) according to a first aspect includes an insulating substrate (1), a resistance element (2), and an electrode (3). The resistance element (2) includes Cr, Si, and N and is disposed on the insulating substrate (1). The electrode (3) includes at least one refractory metal and is disposed on the resistance element (2). The at least one refractory metal is a metal having a melting point of 800° C. or higher. An atomic ratio of Si to Cr in the resistance element (2) is greater than or equal to ⅔ and less than or equal to 4 at least at a center of the resistance element (2) in a thickness direction (D1) defined with respect to the resistance element (2). An atom percentage of N in the resistance element (2) is lower than or equal to 50 atom % at least at the center of the resistance element (2) in the thickness direction (D1).

This aspect enables both a high specific resistance and a low TCR to be achieved. Moreover, this aspect enables an electrical connection between the resistance element (2) and the electrode (3) to be stabilized.

A chip resistor (10) of a second aspect includes an insulating substrate (1), a resistance element (2), and an electrode (3). The resistance element (2) includes Cr, Si, N, and Al and is disposed on the insulating substrate (1). The electrode (3) includes at least one refractory metal and is disposed on the resistance element (2). The at least one refractory metal is a metal having a melting point of 800° C. or higher. An atomic ratio of Si to Cr in the resistance element (2) is greater than or equal to ⅔ and less than or equal to 4 at least at a center of the resistance element (2) in a thickness direction (D1) defined with respect to the resistance element (2). An atom percentage of N in the resistance element (2) is lower than or equal to 50 atom % at least at the center of the resistance element (2) in the thickness direction (D1). An atom percentage of Al in the resistance element (2) is lower than or equal to 30 atom % at least at the center of the resistance element (2) in the thickness direction (D1).

This aspect enables both a high specific resistance and a low TCR to be achieved. Moreover, this aspect enables an electrical connection between the resistance element (2) and the electrode (3) to be stabilized.

In a chip resistor (10) of a third aspect referring the first or second aspect, the resistance element (2) further includes O. An atom percentage of O in the resistance element (2) is lower than or equal to 10 atom % at least at the center of the resistance element (2) in the thickness direction (D1).

This aspect enables the specific resistance of the resistance element (2) to be increased.

In a chip resistor (10) of a fourth aspect referring to any one of the first to third aspects, a specific resistance of the resistance element (2) is greater than or equal to 500 μΩ·cm and less than or equal to 20000 μΩ·cm.

This aspect enables the specific resistance of the resistance element (2) to be adjusted.

In a chip resistor (10) of a fifth aspect referring to any one of the first to fourth aspects, a temperature coefficient of resistance of the resistance element (2) is higher than or equal to −25 ppm/° C. and lower than or equal to +25 ppm/° C.

This aspect enables the temperature coefficient of resistance of the resistance element (2) to be reduced.

A chip resistor (10) of a sixth aspect referring to any one of the first to fifth aspect further includes a surface oxynitride layer (9). The surface oxynitride layer (9) is made of an oxynitride film including Si and at least one of Cr or Al. The surface oxynitride layer (9) is disposed on a portion of a surface (23) on an opposite side of the resistance element (2) from the insulating substrate (1), except for a portion where the electrode (3) is formed.

This aspect enables an electrical connection between the resistance element (2) and the electrode (3) to be stabilized.

A production method of a seventh aspect is a method for producing the chip resistor (10) of any one of the first to sixth aspects. The production method includes an electrode forming step and a patterning step. The electrode forming step is a step of forming the electrode (3) on the resistance element (2) by sputtering. The patterning step is a step of patterning the electrode (3) on the resistance element (2) by etching.

This aspect enables both a high specific resistance and a low TCR to be achieved. Moreover, this aspect enables an electrical connection between the resistance element (2) and the electrode (3) to be stabilized.

A production method of an eighth aspect is a method for producing the chip resistor (10) of any one of the first to sixth aspects. The production method includes an electrode forming step. The electrode forming step is a step of forming the electrode (3) on the resistance element (2) by masked sputtering and patterning the electrode (3).

This aspect enables both a high specific resistance and a low TCR to be achieved. Moreover, this aspect enables an electrical connection between the resistance element (2) and the electrode (3) to be stabilized.

A production method of a ninth aspect referring to the seventh or eighth aspect further includes a heat treatment step. The heat treatment step is a step of performing heat treatment on the resistance element (2) and the electrode (3) formed on the resistance element (2).

This aspect enables the surface oxynitride layer (9) to be formed on the resistance element (2) while the surface oxynitride layer (9) is suppressed from being formed between the resistance element (2) and the electrode (3).

In a method of a tenth aspect referring to the ninth aspect, in the heat treatment step, a heat treatment temperature is higher than or equal to 500° C. and lower than or equal to 800° C.

This aspect enables a more robust surface oxynitride layer (9) to be formed on the resistance element (2).

The configurations of the third to sixth aspects are not essential configurations for the chip resistor (10) and are accordingly omittable.

The configurations according to the ninth and tenth aspects are not essential configurations for the production method and are accordingly omittable.

In a chip resistor (10) of an eleventh aspect referring to any one of the first to sixth aspects, a thickness (Ft1) of the resistance element (2) is greater than or equal to 5 nm and less than or equal to 1000 nm.

This aspect enables the sheet resistance (surface resistivity) of the resistance element (2) to be reduced.

In a chip resistor (10) of a twelfth aspect referring to any one of the first to sixth aspects or the eleventh aspect, the resistance element (2) includes a crystalline phase (21) and an amorphous phase (22).

This aspect enables both an improvement in the specific resistance and a low TCR to be achieved.

In a chip resistor (10) of a thirteenth aspect referring to the sixth aspect, the surface oxynitride layer (9) has a composition gradient from a surface (91) on an opposite side of the surface oxynitride layer (9) from the resistance element (2) into the surface oxynitride layer (9) in the thickness direction (D1).

This aspect provides the advantage that the surface oxynitride layer (9) is less likely to peel off from the resistance element (2).

In a chip resistor (10) of a fourteenth aspect referring to the thirteenth aspect, in the surface oxynitride layer (9), an atomic ratio of Cr to Si is higher at the outermost surface (91) in the thickness direction (D1) than at the center of the resistance element (2) in the thickness direction (D1).

This aspect provides the advantage that the protective performance of the resistance element (2) is improved.

A production method of a fifteenth aspect is a method for producing the chip resistor (10) of any one of the first to sixth aspects or any one of the tenth to fourteenth aspects. The production method includes a resistance element forming step and a patterning step. The resistance element forming step is a step of forming the resistance element (2) on the insulating substrate (1) by reactive sputtering. The patterning step is a step of patterning the resistance element (2) on the insulating substrate (1) by etching the resistance element (2) by photolithography.

This aspect enables the composition of elements included in the resistance element (2) to be controlled.

A method of a sixteenth aspect referring to the fifteenth aspect, a sputtering target of the reactive sputtering includes no more than 20 atom % O.

This aspect enables the resistance element (2) including 0 to be formed.

A production method of a seventeenth aspect referring to the fifteenth or sixteenth aspect further includes a heat treatment step. The heat treatment step is a step of performing heat treatment on the resistance element (2) formed in the patterning step.

This aspect enables the surface oxynitride layer (9) to be formed.

In a method for producing the chip resistor (10) of an eighteenth aspect referring to the seventeenth aspect, in the heat treatment step, a heat treatment temperature is higher than or equal to 300° C. and lower than or equal to 800° C.

This aspect enables a robust surface oxynitride layer (9) to be formed.

A production method of a nineteenth aspect referring to the seventeenth or eighteenth aspect, in the heat treatment step, an oxygen concentration is less than or equal to 1000 ppm.

This aspect enables the surface oxynitride layer (9) to be formed.

In a production method of a twentieth aspect referring to any one of the fifteenth to nineteenth aspects, in the patterning step, an etching solution including hydrofluoric acid is used.

This aspect enables the pattern of the resistance element (2) to be formed on the insulating substrate (1).

REFERENCE SIGNS LIST

1 Insulating Substrate
2 Resistance element
3 Upper Surface Electrode (Electrode)
10 Chip Resistor
D1 Thickness Direction

The invention claimed is:

1. A chip resistor comprising:
an insulating substrate;
a resistance element including Cr, Si, and N and disposed on the insulating substrate;
an electrode including at least one refractory metal and disposed on the resistance element, the at least one refractory metal being a metal having a melting point of 800° C. or higher; and
a surface oxynitride layer made of an oxynitride film including Si, Cr and Al, wherein:
an atomic ratio of Si to Cr in the resistance element is greater than or equal to ⅔ and less than or equal to 4 at least at a center of the resistance element in a thickness direction defined with respect to the resistance element,
an atomic percentage of N in the resistance element being is lower than or equal to 50 atom % at least at the center of the resistance element in the thickness direction, and
an atomic percentage of Si in the surface oxynitride layer is greater than a sum of an atomic percentage of Cr and an atomic percentage of Al in the surface oxynitride layer.

2. The chip resistor of claim 1, wherein
the resistance element further includes O, and
an atomic percentage of O in the resistance element is lower than or equal to 10 atom % at least at the center of the resistance element in the thickness direction.

3. The chip resistor of claim 1, wherein
a specific resistance of the resistance element is greater than or equal to 500 μΩ·cm and less than or equal to 20000 μΩ·cm.

4. A chip resistor of claim 1, wherein
a temperature coefficient of resistance of the resistance element is higher than or equal to −25 ppm/° C. and lower than or equal to +25 ppm/° C.

5. The chip resistor of claim 1, wherein
the surface oxynitride layer is disposed on a portion of a surface on an opposite side of the resistance element from the insulating substrate except for a portion where the electrode is formed.

6. A method for producing the chip resistor of claim 1, the method comprising:
an electrode forming step of forming the electrode on the resistance element by sputtering; and
a patterning step of patterning the electrode on the resistance element by etching.

7. The method of claim 6 further comprising a heat treatment step of performing heat treatment on the resistance element and the electrode formed on the resistance element.

8. The method of claim 7, wherein
in the heat treatment step, a heat treatment temperature is higher than or equal to 500° C. and lower than or equal to 800° C.

9. A method for producing the chip resistor of claim 1, the method comprising an electrode forming step of forming the electrode on the resistance element by masked sputtering and patterning the electrode.

10. A chip resistor comprising:
an insulating substrate;
a resistance element including Cr, Si, N, and Al and disposed on the insulating substrate;
an electrode including at least one refractory metal and disposed on the resistance element, the at least one refractory metal being a metal having a melting point of 800° C. or higher; and
a surface oxynitride layer made of an oxynitride film including Si, Cr and Al, wherein:
an atomic ratio of Si to Cr in the resistance element is greater than or equal to ⅔ and less than or equal to 4 at least at a center of the resistance element in a thickness direction defined with respect to the resistance element,
an atomic percentage of N in the resistance element is lower than or equal to 50 atom % at least at the center of the resistance element in the thickness direction,
an atomic percentage of Al in the resistance element is lower than or equal to 30 atom % at least at the center of the resistance element in the thickness direction, and
an atomic percentage of Si is greater than a sum of an atomic percentage of Cr and an atomic percentage of Al in the surface oxynitride layer.

11. The chip resistor of claim 10, wherein
the resistance element further includes O, and
an atomic percentage of O in the resistance element is lower than or equal to 10 atom % at least at the center of the resistance element in the thickness direction.

12. The chip resistor of claim 10, wherein
a specific resistance of the resistance element is greater than or equal to 500 μΩ·cm and less than or equal to 20000 μΩ·cm.

13. A chip resistor of claims 10, wherein
a temperature coefficient of resistance of the resistance element is higher than or equal to −25 ppm/° C. and lower than or equal to +25 ppm° C.

14. The chip resistor of claim 10, wherein the surface oxynitride layer is disposed on a portion of a surface on an opposite side of the resistance element from the insulating substrate except for a portion where the electrode is formed.

15. A method for producing the chip resistor of claim 10, the method comprising:
an electrode forming step of forming the electrode on the resistance element by sputtering; and
a patterning step of patterning the electrode on the resistance element by etching.

16. The method of claim 15, further comprising a heat treatment step of performing heat treatment on the resistance element and the electrode formed on the resistance element.

17. The method of claim 16, wherein
in the heat treatment step, a heat treatment temperature is higher than or equal to 500° C. and lower than or equal to 800° C.

18. A method for producing the chip resistor of claim 10, the method comprising an electrode forming step of forming the electrode on the resistance element by masked sputtering and patterning the electrode.

* * * * *